UNITED STATES PATENT OFFICE 2,108,915

PROCESS OF TREATING NUTS

William Potter Bullard, Albany, and James Samuel Guy, Atlanta, Ga., assignors to National Pecan Growers Exchange, Albany, Ga., a corporation of Georgia No Drawing. Application August 22, 1931, Serial No. 558,838. Renewed April 24, 1937

5 Claims. (Cl. 99—126)

The treatment of the shells of certain nuts to make them more attractive and marketable without impairing their edibility, palatability and keeping qualities, has been a problem that has long been worked over, and with certain kinds in a measure solved.

But other nuts have not satisfactorily responded to known treatments, and among these particularly are pecans. Attempts have been made to treat such nuts. For example, it has been proposed to color the shells of pecan nuts by tumbling them in a dry pulverized material, such as sienna or burnt iron oxide. It has been found however that in addition to a dark coloring thus imparted to the shells, the weight of the nuts has been so materially increased by the incorporation of the oxide in the pores and on the surfaces, that some authorities have prohibited their sale. It has also been proposed to substitute a liquid dye having sufficient body to fill or substantially close the pores of the shells. But this too has not shown results entirely satisfactory on nuts of the type under discussion and more especially pecans.

The object of the present invention is to provide a process of treating nuts, and particularly those that are initially not satisfactorily subject to a coloring operation, so that they will have a remarkably attractive appearance, adding greatly to their saleable qualities, and in no wise deleteriously affecting the edibility, wholesomeness or palatability of their kernels or meats.

Incidental thereto, the treatment, instead of producing a product in which faulty nuts are camouflaged and thus enter into and become a part of the marketable mass commodity, brings to light and identifies many that are defective, such as rancid nuts, not only making it possible, but really essential to cull out the same and thereby insuring that the treated nuts sold are as a whole superior to those that have heretofore been placed upon the market.

A further and important object is to provide a process that is relatively simple to perform and in which an extremely small proportion of dyeing agent is necessary, so that it constitutes no appreciable addition to the weight of the nuts, does not close or affect the natural pores in the shells, and even if a dye is used that is in itself poisonous (though such dye is not actually employed and is not necessary), its quantity is so minute that even though numbers of the nuts were placed in the mouth and cracked by the teeth, there could and would be no disagreeable results. And in this connection an incidental object is to provide a process in which the shells are not only completely cleaned, but are thoroughly sterilized, thereby making them sanitary.

In carrying out the process the nuts, such as pecans, are first subjected to a bleaching action and are brought to a whitish color much lighter than their ordinary natural color and lighter than the final product.

After being thus bleached, they are dyed to the desired color, preferably a golden brown that is lighter than the original natural color.

The method now considered the preferable one for carrying out the process is as follows:—A bleaching solution is prepared as follows:—To a given quantity of water, say twenty-five gallons, there is added about five or six pounds of sodium hydroxide, which is thoroughly mixed therewith, then chlorine gas is slowly added to the mixture and stirred until the solution will turn litmus paper white.

In this solution the pecan nuts are immersed approximately in the proportion of five pounds of nuts to a quart of the solution and there is added upon such immersion two ozs. of an acid, such as muriatic acid or sulphuric acid. The nuts are agitated in the solution from ten to thirty minutes, depending upon the variety, and they are thereby bleached to a whitish color. The reason for adding the acid is to aid in the bleaching by the liberation of chlorine and to prevent whitish streaks appearing on the nuts from the action of the bleaching solution, which solution of course immediately neutralizes the acid.

After being bleached, the nuts are removed from the solution and are washed in clear water. They will then have a uniform color.

After washing, the bleached nuts are immersed from fifteen to sixty seconds in a weak water solution of a harmless dye that will be fast with cellulose. Preferably this dye is of a brown color and it has been found that the dye, known as "Dupont's Basic Brown" Color Index 332 is peculiarly satisfactory. While the proportions of the dye may vary, it has been found that sixteen grams of the dye dissolved in thirty-two gallons of water, is sufficient for securing satisfactory results. This amount will successfully dye four thousand pounds of nuts and on that basis one pound of dye may be made sufficient to color one hundred thousand pounds. It will be understood that where a weaker solution is employed a longer period of immersion is required and vice versa. The dyeing operation is permitted to continue until the shells of the nuts become a rich golden color, lighter in shade than the original natural color.

The nuts are then removed, washed in water at once and dried.

As a consequence of this treatment the nuts will be found to have a uniform golden color with a soft appearing surface texture, making them much more attractive in appearance and therefore better saleable. But a further and unexpected result that has been found is that faulty nuts and particularly those which have become rancid do not react to the treatment as do the properly filled and plump meated nuts. Indeed it has been found that the unfilled nuts too become different in appearance because they do not respond in the same way to the treatment, and while it is not clear just why this is true, yet with rancid nuts apparently it is because the oil cells have broken down and the oil penetrates the shell, interfering with the proper carrying out of the process, and resulting in a distinctive color that is easily recognized. They are darker in color and do not have the golden brown color imparted to the other nuts. A large proportion of the bad nuts therefore become recognizable and are not camouflaged because their appearance is decidedly against them among good nuts. They therefore not only can be readily culled, but it becomes essential to remove them.

While the process is exemplified as applied to pecan nuts, it will be clear that it may be employed on others as for instance filberts and Brazil nuts.

What we claim is:

1. A process of improving the appearance of high quality unshelled nuts while rendering imperfect unshelled nuts readily distinguishable from the high quality nuts including the substantial elimination of the imperfect from the high quality nuts, which comprises subjecting a quantity of unshelled nuts as they are normally handled in bulk to a bleaching treatment, to thereby render the shells lighter than the natural color thereof, and thereafter subjecting the bleached nuts to such dyeing treatment that upon the washing and drying of the same the sound nuts will be evenly colored while imperfect nuts will present color characteristics which readily distinguish them from the sound nuts, and separating the imperfect nuts from the sound nuts, whereby substantially all imperfect nuts may be eliminated from the bulk before the unshelled nuts are distributed and the sound nuts are enhanced in appearance.

2. A process of improving the appearance of high quality unshelled nuts while rendering imperfect unshelled nuts readily distinguishable from the high quality nuts, which comprises subjecting a quantity of unshelled nuts including imperfect nuts as they are normally handled in bulk to a bleaching action, and thereafter subjecting the bleached nuts to a dyeing material of Dupont's Basic Brown which will cause the sound nuts to be evenly colored while the imperfect nuts will present distinguishing color characteristics, and separating the imperfect nuts from the sound nuts, whereby substantially all imperfect nuts may be eliminated from the bulk before the unshelled nuts are distributed and the sound nuts are enhanced in appearance.

3. A process of improving the appearance of high quality unshelled nuts while rendering imperfect unshelled nuts readily distinguishable from the high quality nuts, which comprises subjecting a quantity of unshelled nuts including rancid unpalatable nuts as they are normally handled in bulk to a bleaching agent, and thereafter subjecting the bleached nuts to a dye bath containing Dupont's Basic Brown until the sound nuts assume a common color while the rancid unpalatable nuts are of a color darker than the sound nuts, whereby substantially imperfect nuts may be eliminated from the bulk before the unshelled nuts are distributed and the sound nuts are enhanced in appearance.

4. A process of improving the appearance of high quality unshelled nuts while rendering imperfect unshelled nuts readily distinguishable from the high quality nuts, which comprises subjecting a quantity of unshelled nuts including rancid unpalatable nuts as they are normally handled in bulk to a chlorine bleaching agent, and thereafter subjecting the bleached nuts to a dye bath containing Dupont's Basic Brown until the sound nuts assume a common color while the rancid unpalatable nuts are of a color darker than the sound nuts, whereby substantially imperfect nuts may be eliminated from the bulk before the unshelled nuts are distributed and the sound nuts are enhanced in appearance.

5. A process of improving the appearance of high quality unshelled pecan nuts while rendering imperfect unshelled nuts readily distinguishable from the high quality nuts, which comprises subjecting a quantity of unshelled nuts including rancid unpalatable nuts as they are normally handled in bulk to a bleaching agent, and thereafter subjecting the bleached nuts to a dye bath containing Dupont's Basic Brown until the sound nuts assume a common color while the rancid unpalatable nuts are of a color darker than the sound nuts, whereby substantially all rancid unpalatable nuts may be eliminated from the bulk before the unshelled nuts are distributed and the sound nuts are enhanced in appearance.

WILLIAM P. BULLARD.
JAMES SAMUEL GUY.